United States Patent Office 2,888,422
Patented May 26, 1959

2,888,422

FILM FORMING AQUEOUS COLLOIDAL DISPERSIONS CONTAINING TRIS(HYDROXYMETHYL) NITROMETHANE AND METHOD FOR PREPARING SAME

Robert L. Johnson and Edgar M. Adams, Midland, Mich., assignors to The Dow Chemical Company, Midland, Mich., a corporation of Delaware No Drawing. Application July 1, 1957
Serial No. 668,903

10 Claims. (Cl. 260—29.7)

This invention relates to improved aqueous colloidal dispersions. It is particularly concerned with compositions comprising synthetic latexes and a method for making such compositions.

Synthetic latexes have found widespread application in the protective coating field. In such usage, the latex or a composition containing it is applied to masonry, metal or wood surfaces whereby films are formed which tend to adhere to the solid surface and protect the latter against marring and weathering. The latexes commonly are modified by the addition of pigments and other agents to provide latex paint compositions which have desirable properties as regards ease of application, ease of clean-up, self-sealing, alkali resistance and odor. The synthetic latexes are also employed as saturants for papers to improve such properties as tear resistance.

Certain problems have been encountered in the storage and application of synthetic latexes and compositions in which they are employed. For example, the synthetic latexes contain stabilizers and emulsifiers to maintain the polymer in the dispersed state. Many commonly employed stabilizers and emulsifiers are organic in nature and subject to attack by microorganisms. When the latexes are employed in latex paint formulations, they are modified with other additaments such as thickeners, pigment dispersants and stabilizers which are also subject to attack by bacteria and fungi. The resultant microbiological activity frequently results in undesirable alterations in the viscosity of the latex system and unfavorably affects its spreading and odor characteristics.

In commercial latex paint formulation, various preservatives have been employed to prevent attack by microorganisms. To accomplish such control with phenols and their salts it has been found necessary to maintain the latex compositions at a pH of 9 or higher. However, to minimize viscosity changes caused by hydrolytic breakdown of common protein components, prevent detinning of containers and permit general flexibility in manufacture and use, it is desirable that latex compositions be maintained at lower pH levels. Thus, the phenols and phenolates do not represent the ultimate as preservatives. Other preservatives such as organic mercury compounds, on the other hand, are not only hazardous because of toxicity but unfavorably affect color stability in certain formulations. Furthermore, certain preservatives undergo diminution in activity or reduction in killing power upon storage or standing on the shelf. This is of particular importance in latex paints which may be subject to subsequent infection by opening of containers, insertion of brushes, exposure to dust and other sources of infection. Certain other preservatives frequently have adverse effects on the colloidal latex system when an amount sufficient to provide adequate protection is added.

Many preservatives are unsuitable in latexes and latex paints since they have been found to affect the films cast therefrom or to affect the brushing and spreading characteristics. Further, with certain preservatives such as phenolic agents, a relatively high concentration is required which contributes to the problems of sensivity and spotting which are frequently incurred when films cast from presently used latex and latex paints are subjected to washing, spattering or conditions which lead to condensation of water on coated surfaces. The desirability of the provision of improved synthetic latex and latex-containing compositions and methods for avoiding the problems inherent in the application of such compositions is evident.

It is an object of the present invention to provide for improved compositions of aqueous colloidal dispersions comprising synthetic latexes. A further object is to provide synthetic latexes characterized by properties of resistance to microbial attack and degradation. A further object is to provide an improved method for rendering compositions comprising synthetic latexes resistance to microbial attack and degradation. A still further object is to provide a method for producing latex paint compositions which are resistant to the attack of microorganisms. Other objects will become apparent from the following specification and claims.

According to the present invention, it has been discovered that improved aqueous colloidal dispersions comprising synthetic latexes are obtained when there is incorporated into the synthetic latex a minor and effective proportion of tris(hydroxymethyl)nitromethane. Tris(hydroxymethyl)nitromethane is soluble in water and polar solvents and when incorporated into aqueous colloidal dispersions comprising synthetic latex impart thereto a property of resistance to microbially induced degradation even when added in amounts considerably less than that now employed with known preservatives. The tris(hydroxymethyl)nitromethane which provides the improved composition may be represented by the following structure:

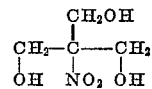

A number of desirable properties characterize the aqueous colloidal dispersions provided by this invention. For example, all of the latex and latex paint compositions of the present invention are found to be resistant to microbial deterioration and without adverse effects on the color or other desirable properties of the latex. This protective action is observed on repeated inoculation of latex compositions with organisms isolated from water, soil and contaminated latex. Furthermore, it is observed throughout the neutral and alkaline pH range. In addition, the free films and/or coatings formed from such compositions exhibit stability against degradation such as discoloration, surface breakdown, peeling and waterspotting suffered on exposure to heat, light and/or water that is frequently encountered in films formed from latex compositions modified by adding known preservatives. Thus, with latex and latex paint compositions containing aliphatic nitroalcohols, films and coatings may be formed in which the desirable properties of the films and coatings formed from latex compositions containing no preservative are retained. Furthermore, latex compositions of this invention have the same non-hazardous properties as the latex compositions containing no added preservative.

The expression "synthetic latex" as herein employed is intended to mean any aqueous colloidal dispersion of polymers of polymerizable olefinically unsaturated monomers. Examples of such polymeric materials are homopolymers and copolymers of monoethylenically unsaturated compounds such as styrene, acrylonitrile, acrylic and methacrylic esters, vinyl halide, and vinylidene halide, and vinyl acetate; and copolymers of monoethylenically unsaturated compounds such as styrene and acrylonitrile with conjugated diolefins such as butadiene and chloroprene. The syntheic latexes are aqueous dispersions usually containing in addition to the polymer, an emulsifying agent and buffers. They may, in addition, contain other non-polymeric additives such as a plasticizer or stabilizer. Representative of the synthetic latexes with which this invention is concerned are those described in U.S. Patent No. 2,498,712. Emulsifying agents which may be employed include sodium oleate, sodium sulfate esters of higher alcohols, or sodium sulfonate of alkylated naphthalenes. Buffers which are oftentimes used include sodium bicarbonate and sodium tetraborate.

The term "latex paint" as herein employed refers to an aqueous colloidal dispersion containing a synthetic latex composition as above defined to which has been added a pigment. The term "pigment" denotes colored as well as white pigments and is understood to be inclusive of mineral products used as fillers and extenders. Suitable pigment materials are well-known and good results have been obtained when employing the lithopones, titanium dioxide, barium sulfate, calcium carbonate, clays, mica, talc, silica and the like in various combinations and proportions depending on the end use for which the paint is designed. Colored pigments and dyes which have been found compatible in these compositions include benzylidene yellow, cadmium yellow, carbon blacks, chromium oxides and hydroxides, Hansa yellow, iron oxides, toluidine toners, sienna, umber and ultramarine blues. Suitable pigment dispersants such as tetrasodium pyrophosphate, lecithin and gum arabic may be employed. In addition, pigment dispersants, thickeners and other paint-making ingredients may be present in latex paint. These ingredients and latex paint compositions containing them are extensively described in the art, e.g. in U.S. Patent No. 2,498,712. Colloid stabilizers and thickeners which may be used include casein, α-protein, and water soluble cellulose derivatives. The preferred polymeric materials to be contained in the synthetic latexes in accordance with the present invention are copolymers prepared from 25 to 75 percent of at least one conjugated aliphatic diolefin and 75 to 25 percent of at least one vinyl-aromatic compound. Typical conjugated diolefins are butadiene and isoprene. Typical vinyl-aromatic compounds are hydrocarbons of the benzene series having a vinyl group on benzene or substituted benzene nucleus and include styrene and vinyltoluene.

Tris(hydroxymethyl)nitromethane may be employed in any antimicrobial amount. While good results have been obtained with from 0.002 to 1 percent by weight of the tris(hydroxymethyl)nitromethane, when based on the total weight of synthetic latex, the range of from 0.01 to 0.5 percent by weight is preferred. In preparing the improved aqueous colloidal dispersion, the tris(hydroxymethyl)nitromethane is blended with the synthetic latex by mechanical mixing. This nitroalcohol is usually first dissolved in water, ethanol, 50:50 methanol water or other suitable solvent and thereafter introduced into the latex with agitation. Good results have been obtained by employing water or alcoholic solutions containing 35 to 50 percent of the tris(hydroxymethyl)nitromethane.

When the aqueous colloidal dispersion is a latex paint, good results have been obtained when tris(hydroxymethyl)nitromethane is employed in an amount of from about 0.03 to 1.0 percent by weight. This percentage by weight is calculated on the basis of the weight of tris(hydroxymethyl)nitromethane and the total weight of the paint employed. It is preferred that at least 0.05 percent by weight of the nitroalcohol be added to the latex paint. The incorporation of tris(hydroxymethyl)nitromethane into the paint may be made at any point in its manufacture. It may be introduced before or after the addition of the pigment dispersion to the latex or added to said dispersion. Conveniently a solution of tris(hydroxymethyl)nitromethane may be blended into the formulated latex paint.

Representative synthetic latexes may be prepared by polymerizing mixtures of suitable monomeric compounds in aqueous emulsion in accordance with known procedures. As described in U.S. Patent 2,498,712, the polymerizable compounds, in proportions corresponding to the desired composition of the polymeric product, may be mixed with an aqueous solution of an emulsifying agent and the mixture agitated to effect emulsification. The emulsifying agent is ordinarily employed in amount corresponding to from 0.5 to 5 percent of the weight of the polymerizable organic compounds, but it may be used in smaller or larger proportions. A catalyst such as a peroxide is usually added in amount corresponding to from 0.5 to 4 percent of the weight of the compounds to be polymerized, but is not always required. A buffer may be added if desired. The emulsion is heated in a closed container, generally at temperatures between 50° and 100° C., to effect polymerization. After completion of the polymerization, the property of the resulting polymeric dispersion may be modified, if desired, by the incorporation in the dispersion of other additives such as plasticizers or stabilizers.

An example of synthetic latexes which may be employed is a GRS type latex. A representative latex is an approximately 35 percent aqueous colloidal dispersion containing a copolymer of approximately 50 percent butadiene and 50 percent styrene prepared by emulsion polymerization. This latex may be prepared by charging a reactor with the following:

| | Parts by weight |
|---|---|
| Butadiene | 18.0 |
| Styrene | 18.0 |
| Water | 64.0 |
| Emulsifier (soap flakes) | 1.54 |
| Catalyst (potassium persulfate) | 0.090 |

The mixture is then agitated to effect emulsification and heated at a temperature of 50° C. for 23 hours to cause polymerization. A post stabilizer (35 percent solution of potassium oleate) is added to the resultant latex in the ratio of 4.71 parts by weight of post stabilizer for every 90 parts by weight of latex and the mixture then heated to steam distill the volatiles and recover an approximately 50:50 styrene-butadiene latex of 35 percent solids content. The synthetic latex thus prepared may be employed for the preparation of a paint emulsion. A typical paint may be formulated by blending 69 parts by weight of the above latex with 100 parts by weight of a pigment paste of the following composition:

| Ingredient | Parts by Weight |
|---|---|
| Water | 10.1 |
| Sodium pyrophosphate ($Na_4P_2O_7 \cdot 10H_2O$) | 0.5 |
| Titanium dioxide | 47.0 |
| Lithopone | 13.4 |
| Mica | 6.7 |
| α-Protein (10 percent solution) | 19.1 |
| Pine Oil | 0.3 |
| Tributyl phosphate | 2.5 |

Variations may be made in the above formula as will be apparent to those skilled in the art.

Tris(hydroxymethyl)nitromethane is commercially available. It may also be prepared by the reaction of one molecular proportion of nitromethane with three molecular proportions of formaldehyde in the presence of a basic catalyst.

The following examples illustrate the invention but are not to be construed as limiting.

EXAMPLE 1

A commercial GRS-2000 type latex prepared by a method well-known in the art comprising polymerizing an aqueous dispersion containing the following ingredients:

| | Parts by weight |
|---|---|
| Styrene | 50 |
| Butadiene | 50 |
| Rosin soap | 5 |
| Potassium persulfate | 0.5-0.6 |
| Normal-dodecylmercaptan | 0.45 | and thereafter post-stabilized with 1.5 parts by weight of potassium oleate. The post-stabilized latex of 39-42 percent solids content was modified by adding tris(hydroxymethyl)nitromethane. The modified composition contained varying concentrations of tris(hydroxymethyl)nitromethane per total weight of latex employed. Twenty gram portions of these latex compositions as well as a check sample containing no tris(hydroxymethyl)nitromethane were then inoculated with 0.05 milliliter portions of a 24 hour nutrient broth culture of a mixture of eight organisms consisting largely of Pseudomonas, Bacillus and Proteus species and previously isolated from spoiled samples of α-protein, latex and latex paint. The inoculated samples were maintained at about 25° C. for 24 hours after inoculation, then multiple streaks made from these samples on poured nutrient agar plates and the latter incubated at 30° C. for 48 hours. At the end of this period, the plates were examined for microbial growth. The results obtained are set forth in Table I.

*Table I*

| Concentration in Percent by Weight | Microbial Growth |
|---|---|
| 0.25 | Trace. |
| 0.1 | Do. |
| 0.05 | Do. |
| 0.01 | Do. |
| None (Check) | Heavy. |

EXAMPLE 2

In a similar manner, a synthetic GRS-2000 type latex of the composition described in Example 1 was modified by adding tris(hydroxymethyl)nitromethane in varying concentrations. Twenty gram portions of modified as well as unmodified samples were inoculated with 0.05 milliliter portions of a mixed culture of organisms as previously described and maintained at about 25° C. for 1 week. The samples were then streaked, incubated and observed as described in Example 1. The results are set forth in Table II.

*Table II*

| Concentration in Percent by Weight | Microbial Growth |
|---|---|
| 0.25 | None. |
| 0.1 | Do. |
| 0.05 | Do. |
| None (check) | Heavy. |

EXAMPLE 3

In a manner as described in Example 1, a synthetic GRS-2000 type latex was modified by adding tris(hydroxymethyl)nitromethane in a concentration of 0.25 percent by weight of the total weight of latex. Portions of modified as well as unmodified latex samples were inoculated as previously described and the inoculated latex samples maintained at about 25° C. for 2 weeks. The samples were then streaked, incubated and observed as described in Example 1. There was no growth in the latex samples modified by the addition of tris(hydroxy)nitromethane whereas there was heavy growth in the check samples containing no added tris(hydroxymethyl)nitromethane.

EXAMPLE 4

Samples of Hycar 1562 (a commercially available synthetic latex of acrylonitrile-butadiene copolymer) were modified by the addition of tris(hydroxymethyl)nitromethane to give latex samples containing different concentrations of the tris(hydroxymethyl)nitromethane based on the total weight of latex. Twenty gram portions of the modified as well as unmodified samples were inoculated with 0.05 milliliter portions of a mixed culture of organisms as previously described, and maintained at about 25° C. At varying intervals, multiple streaks were made from these samples on agar plates and the latter incubated at 30° C. for 48 hours and thereafter examined as described in Example 1. The results are set forth in Table III.

*Table III*

| Concentration in Percent by Weight | Interval After Incubation | Microbial Growth |
|---|---|---|
| 0.25 | 24 hours | Trace. |
| 0.25 | 1 week | None. |
| 0.25 | 2 weeks | Do. |
| 0.05 | 24 hours | Trace. |
| 0.05 | 1 week | None. |
| 0.05 | 2 weeks | Do. |
| None (Check) | 24 hours | Heavy. |
| Do | 1 week | Do. |
| Do | 2 weeks | Do. |

EXAMPLE 5

A commercially available synthetic 60 percent styrene-40 percent butadiene copolymer latex (Dow Latex 512-R) of approximately 48 percent solids content was modified by adding tris(hydroxymethyl)nitromethane. Each modified composition contained 0.1 percent by weight of the tris(hydroxymethyl)nitromethane. The pH of the samples were adjusted to 8.5 by bubbling carbon dioxide therethrough. Fifty gram portions of the various modified latex compositions as well as unmodified latex composition were inoculated with 0.1 milliliter of a mixed culture of organisms as described in Example 1. The inoculated samples were maintained at about 25° C. and at various intervals after inoculation, multiple streaks were made from these samples on agar plates and the latter incubated and observed as previously described. The results are set forth in Table IV.

*Table IV*

| Interval After Inoculation | Microbial Growth |
|---|---|
| 24 hours | None. |
| 1 week | Do. |
| 2 weeks | Do. |

Unmodified samples show heavy growth at all three intervals.

EXAMPLE 6

Commercially available 60 percent styrene-40 percent butadiene copolymer latex (Dow Latex 512-R) was modified by adding varying concentrations of tris(hydroxymethyl) nitromethane. The pH of the latex was 10.5. Fifty gram portions of modified and unmodified latex were inoculated, maintained, streaked, incubated and observed as previously described. The results are as follows:

Table V

| Concentration in Percent by Weight | Interval After Inoculation | Microbial Growth |
|---|---|---|
| 0.25 | 24 hours | None. |
| 0.25 | 1 week | Do. |
| 0.25 | 2 weeks | Do. |
| 0.1 | 24 hours | Do. |
| 0.1 | 1 week | Do. |
| 0.1 | 2 weeks | Do. |
| 0.01 | 24 hours | Do. |
| 0.01 | 1 week | Do. |
| 0.01 | 2 weeks | Do. |
| 0.005 | 24 hours | Do. |
| 0.005 | 1 week | Do. |
| 0.005 | 2 weeks | Do. |
| None (Check) | 24 hours | Heavy. |
| Do | 1 week | Do. |
| Do | 2 weeks | Do. |

EXAMPLE 7

A latex paint formulation employing a GRS type latex comprising a copolymer of 50 percent styrene and 50 percent butadiene and prepared as previously described is modified by adding tris(hydroxymethyl)nitromethane in varying concentrations as indicated below:

| | Concentration in percent by weight |
|---|---|
| Sample A | 0.03 |
| Sample B | 0.04 |
| Sample C | 0.08 |
| Sample D | 0.10 |

Each modified paint sample as well as unmodified paint sample is then inoculated with a mixed culture of organisms previously described and maintained, streaked and incubated as previously set forth. On observations of the streaks after a period of incubation, no growth is noted on the streaks made from samples of modified paint but heavy growth is noted on streaks made from samples of unmodified paint.

EXAMPLE 8

A synthetic latex paint was made by intimately blending in a conventional manner 100 grams of a pigment dispersion of the following composition

| Ingredient | Amount |
|---|---|
| Water milliliters | 807 |
| Sodium pyrophosphate (Na₄P₂O₇).10H₂O grams | 43.44 |
| Titanium dioxide do | 3,726 |
| Lithopone do | 1,064.4 |
| Ground Mica do | 529.8 |
| α-Protein (10 percent) do | 1,515.6 |
| Pine Oil do | 63.3 |
| Tributylphosphate do | 201 | with 69 milliliters of a 48 percent solids synthetic latex of a copolymer of 60 percent styrene and 40 percent butadiene (Dow Latex 512–K). This latex paint composition was modified to give compositions containing tris-(hydroxymethyl)nitromethane in varying concentrations. Fifty gram samples of modified paint were inoculated with 0.1 milliliter of a mixed culture of organisms, maintained, streaked, incubated and observed as described in Example 1. The results were as follows:

Table VI

| Concentration in Percent by Weight | Interval After Inoculation, weeks | Microbial Growth |
|---|---|---|
| 0.1 | 1 | None. |
| 0.1 | 2 | Do. |
| 0.075 | 1 | Do. |
| 0.075 | 2 | Do. |
| 0.05 | 1 | Do. |
| 0.05 | 2 | Do. |

Latex paint unmodified with nitroalcohol shows heavy microbial growth at 1 and 2 week intervals.

EXAMPLE 9

Tris(hydroxymethyl)nitromethane is incorporated into commercial synthetic latexes at varying concentrations (in percent by weight based on the total weight of paint) as shown below:

| Latex | Concentration in Percent by Weight |
|---|---|
| Geon 576[1] | 0.25 |
| Do | 0.1 |
| Lytron 615[2] | 0.25 |
| Do | 0.1 |
| Elvacet 81-900[3] | 0.25 |
| Do | 0.1 |
| Rhoplex AC-33[4] | 0.25 |
| Do | 0.1 |

[1] Commercial vinyl chloride-acrylic ester copolymer.
[2] Commercial polystyrene.
[3] Commercial polyvinylacetate.
[4] Commercial ethyl acrylate-methyl methacrylate copolymer.

The above modified latexes as well as unmodified latex samples for each type of latex are inoculated with a mixed culture of organisms. The modified latex samples remain free from microbial growth whereas the unmodified samples undergo spoilage due to microbial growth.

We claim:

1. An aqueous colloidal dispersion comprising (1) a synthetic latex containing in the disperse phase a polymer obtained by polymerizing an olefinically unsaturated monomer and (2) from about 0.002 to 1 percent by weight of tris(hydroxymethyl)nitromethane wherein the amount is based on the total weight of synthetic latex.

2. An aqueous colloidal dispersion comprising (1) a synthetic latex containing in the disperse phase a copolymer of a conjugated diolefin and a vinyl-aromatic compound of the benzene series and (2) from about 0.002 to 1 percent by weight of tris(hydroxymethyl)nitromethane wherein the amount is based on the total weight of synthetic latex.

3. An aqueous colloidal dispersion comprising (1) a synthetic latex containing in the disperse phase a copolymer of from 25 percent to 75 percent of butadiene and correspondingly from 75 percent to 25 percent by weight of a vinylaromatic hydrocarbon of the benzene series, and (2) from about 0.002 to 1 percent by weight of tris(hydroxymethyl)nitromethane wherein the amount is based on the total weight of synthetic latex.

4. An aqueous colloidal dispersion comprising a synthetic latex containing in the disperse phase a polymer obtained by polymerizing an olefinically unsaturated monomer having intimately blended therein from about 0.002 to 1 percent by weight of tris(hydroxymethyl)nitromethane wherein the amount is based on the total weight of synthetic latex.

5. An aqueous colloidal dispersion comprising a synthetic latex containing in the disperse phase a polymer obtained by polymerizing an olefinically unsaturated monomer having intimately blended therein from 0.01 to 0.5 percent by weight of tris(hydroxymethyl)nitromethane wherein the amount is based on the total weight of synthetic latex.

6. A latex paint composition consisting of an aqueous colloidal dispersion comprising (1) a pigment, (2) a synthetic latex containing in the disperse phase a polymer obtained by polymerizing an olefinically unsaturated monomer, and (3) from about 0.03 to 1 percent by weight of tris(hydroxymethyl)nitromethane wherein the amount is based on the total weight of latex paint.

7. A latex paint composition consisting of an aqueous colloidal dispersion comprising (1) a pigment, (2) a synthetic latex containing in the disperse phase a copolymer of from 25 percent to 75 percent by weight of butadiene and correspondingly from 75 percent to 25 percent by weight of a vinylaromatic hydrocarbon of the benzene series, and (3) from about 0.03 to 1 percent by weight of tris(hydroxymethyl)nitromethane wherein the amount is based on the total weight of latex paint.

8. A latex paint composition consisting of an aqueous colloidal dispersion comprising (1) a pigment, (2) a synthetic latex containing in the disperse phase a copolymer of from 25 percent to 75 percent by weight of butadiene and correspondingly from 75 percent to 25 percent by weight of a vinyl-aromatic hydrocarbon of the benzene series, and (3) from 0.05 to 1 percent by weight of tris(hydroxymethyl)nitromethane wherein the amount is based on the total weight of latex paint.

9. A method for rendering synthetic latex compositions resistant to microbiological degradation, said synthetic latex composition containing in the disperse phase a polymer obtained by polymerizing an olefinically unsaturated monomer, which comprises the step of intimately blending in the composition tris(hydroxymethyl)nitromethane in the amount of from about 0.002 to 1 percent by weight based on the total weight of synthetic latex.

10. A method of producing latex paint compositions resistant to microbially induced degradation, said latex paint composition comprising a synthetic latex containing in the disperse phase a polymer obtained by polymerizing an olefinically unsaturated monomer, which comprises blending in the latex paint composition during its manufacture, tris(hydroxymethyl)nitromethane in an amount of from 0.03 to 1 percent by weight based on the total weight of latex paint.

References Cited in the file of this patent

UNITED STATES PATENTS

| | | |
|---|---|---|
| 2,231,458 | Trowell | Feb. 11, 1941 |
| 2,426,128 | Trowell | Aug. 19, 1947 |